US012780433B2

(12) United States Patent
Powell et al.

(10) Patent No.: US 12,780,433 B2
(45) Date of Patent: Nov. 3, 2026

(54) ENGINE MOUNT FITTING

(71) Applicant: The Boeing Company, Arlington, VA (US)

(72) Inventors: Donald Thomas Powell, Everett, WA (US); Adrian Stanescu, Maple Valley, WA (US); Druh Saul Palma, Mill Creek, WA (US); Kyle David Stevens, Mill Creek, WA (US)

(73) Assignee: THE BOEING COMPANY, Arlington, VA (US)

( * ) Notice: Subject to any disclaimer, the term of this patent is extended or adjusted under 35 U.S.C. 154(b) by 88 days.

(21) Appl. No.: 18/822,797

(22) Filed: Sep. 3, 2024

(65) Prior Publication Data

US 2025/0100701 A1 Mar. 27, 2025

Related U.S. Application Data

(60) Provisional application No. 63/540,434, filed on Sep. 26, 2023.

(51) Int. Cl.
*B64D 27/40* (2024.01)

(52) U.S. Cl.
CPC .................................. *B64D 27/402* (2024.01)

(58) Field of Classification Search
CPC ...... B64D 27/402; B64D 27/18; B64D 27/40; B64D 27/12; B64D 27/404
See application file for complete search history.

(56) References Cited

U.S. PATENT DOCUMENTS

| | | | | |
|---|---|---|---|---|
| 9,027,875 B2 * | 5/2015 | West | B64D 27/402 | 244/54 |
| 9,238,511 B2 * | 1/2016 | Woolley | B64D 29/02 | |
| 10,730,634 B2 * | 8/2020 | Colmagro | B64D 27/402 | |
| 10,814,994 B2 * | 10/2020 | Colmagro | B64D 27/402 | |
| 11,472,573 B2 * | 10/2022 | Chauveau | B64D 27/402 | |
| 11,679,888 B2 * | 6/2023 | West | B64D 27/40 | 244/54 |
| 2008/0237394 A1 * | 10/2008 | Combes | B64D 27/402 | 244/54 |
| 2008/0251634 A1 * | 10/2008 | Bernardi | B64D 27/18 | 244/54 |
| 2009/0212155 A1 * | 8/2009 | Huggins | B64D 27/402 | 244/54 |
| 2009/0294579 A1 * | 12/2009 | Eve | B64D 27/18 | 244/54 |

(Continued)

FOREIGN PATENT DOCUMENTS

CN 107512399 B 4/2020

OTHER PUBLICATIONS

EP Search Report mailed Jan. 31, 2025 in re EP Application No. 24200507.2.

*Primary Examiner* — Assres H Woldemaryam
(74) *Attorney, Agent, or Firm* — COATS & BENNETT, PLLC

(57) ABSTRACT

A fitting to mount an engine to a wing of an aircraft. The fitting includes a body with a first end and a second end. A first pocket is positioned at the first end with the first pocket sized to receive the forward engine mount fitting. A second pocket is positioned at the second end with the second pocket sized to receive a strut of the wing of the aircraft. The body includes a first section and a second section that are connected together.

20 Claims, 9 Drawing Sheets

(56) References Cited

U.S. PATENT DOCUMENTS

| | | | | |
|---|---|---|---|---|
| 2011/0011972 | A1* | 1/2011 | Vache | B64D 27/402<br>244/54 |
| 2011/0204179 | A1* | 8/2011 | Skelly | B64D 27/402<br>244/54 |
| 2012/0056033 | A1* | 3/2012 | Teulou | B64D 27/404<br>244/54 |
| 2014/0151497 | A1* | 6/2014 | Weir | B64D 27/402<br>244/54 |
| 2017/0106990 | A1* | 4/2017 | Journade | B64D 27/402 |
| 2020/0031482 | A1 | 1/2020 | Deforet et al. | |
| 2020/0148378 | A1* | 5/2020 | Pautis | B64C 3/32 |
| 2022/0204175 | A1* | 6/2022 | Tulloch | B64D 27/40 |

* cited by examiner

ENGINE MOUNT FITTING

RELATED APPLICATIONS

This application claims priority to U.S. Provisional Patent Application Ser. No. 63/540,434 filed on Sep. 26, 2023, which is incorporated herein by reference in its entirety.

TECHNOLOGICAL FIELD

The present disclosure relates generally to the field of engine mounts for aircraft and, more specifically, to engine mounts constructed from multiple sections to facilitate attachment of the engine to a wing of an aircraft.

BACKGROUND

Certain aircraft include wings with structural members that support an engine. The structural member is designed to support and securely connect the engine to the aircraft. Because of the position of the structural member relative to the engine, the structural member affects the air flow and thus the operation of the engine. The aerodynamics of the structural member has greater effect in aircraft with particular engines, such as those that include exposed blades. One type is an unducted turbofan engine that includes exposed fan blades in combination with a gas turbine engine. The fan aerodynamics become highly sensitive to the shape and size of the structural member.

The design aspects of the structural member are generally something of a compromise between the aerodynamic and structural requirements. The aerodynamic needs prefer that the structural member be small and unobtrusive to reduce aerodynamic drag. The structural needs require that the structural member have adequate size and dimensions to support the engine.

Thus, there is a need for a structural member that effectively mounts an engine to an aircraft and also includes an effective aerodynamic design.

SUMMARY

One aspect is directed to a fitting to mount an engine to a wing of an aircraft. The fitting comprises a body with a first end and a second end. A first pocket is positioned at the first end with the first pocket sized to receive the forward engine mount fitting. A second pocket is positioned at the second end with the second pocket sized to receive a strut box of the wing of the aircraft. The body comprises a first section and a second section that are connected together.

In another aspect, the first section and the second section abut together at a joint that extends along a length of the body.

In another aspect, the body comprises a tapered shape that increases from the first end to the second end.

In another aspect, the taper is consistent along the length from the first end to the second end.

In another aspect, the first section is a mirror image of the second section.

In another aspect, the first end is open to receive the forward engine mount fitting and the second end is open to receive the strut box.

In another aspect, flanges extend along a first side of the body and an opposing second side of the body with the flanges comprising a central flange section and laterally-extending stiffeners that are spaced apart along a length of a central flange section.

In another aspect, a first portion of the flanges are mounted to the first section and a second portion of the flanges are mounted to the second section.

In another aspect, a receptacle is positioned along one side of the body with the receptacle comprising opposing lateral walls that extend outward from the side of the body and one or more ribs that extend between the lateral walls.

In another aspect, ribs extend outward from inner sides of the first section and the second section with the ribs abutting together when the first section and the second section are connected together.

In another aspect, the body comprises two or more flat sides.

One aspect is directed to a fitting to mount an engine to a wing of an aircraft. The fitting comprises a first section and a second section each comprising: a lateral side; a top side; a bottom side; and an inner side. The first section and the second section are configured to connect together along the inner sides to form a body with the body comprising: a first side formed by the lateral side of the first section; a second side formed by the lateral side of the second section; a third side formed by the top sides of the first section and the second section; and a fourth side formed by the bottom sides of the first section and the second section.

In another aspect, an interior space is positioned within the body with the interior space comprising a first pocket positioned at a first end of the body to receive a forward engine mount fitting and a second pocket positioned at a second end of the body to receive the strut box of the wing.

In another aspect, the first pocket and the second pocket are each surrounded by the first section and the second section.

In another aspect, the first section is a mirror image of the second section.

In another aspect, ribs extend outward from inner faces of the lateral sides of the first section and the second section with the ribs having exposed ends that abut together when the first section and the second section are connected together.

In another aspect, the lateral sides are flat to connect with brackets of an aft engine mount fittings.

In another aspect, flanges extend outward from the body and comprising a flange section and lateral stiffeners with the flanges configured to form a structural interface that takes both shear and tension.

In another aspect, fasteners that extend through and connect the first section to the second section.

In another aspect, the first section and the second section abut together with at a joint that extends longitudinally through the body.

One aspect is directed to a method of attaching an engine to a wing of an aircraft. The method comprises: attaching a first fitting to a first section of an aft engine mount fitting of a ridgeback fitting; attaching a second fitting to a second section of the aft engine mount fitting of the ridgeback fitting and connecting together the first section and the second section of the ridgeback fitting; attaching a forward engine mount fitting to the ridgeback fitting; attaching the ridgeback fitting to a strut box on a wing of an aircraft; and attaching the engine to the forward engine mount fitting and to the first fitting and the second fitting of the aft engine mount fitting and thereby attaching the engine to the wing of the aircraft.

In another aspect, the method further comprises positioning the forward engine mount fitting at first ends of the first section and the second section and then connecting together the first section and the second section of the ridgeback fitting and connecting the forward engine mount fitting to the ridgeback fitting.

In another aspect, the method further comprises aligning a first section of flanges on the first section with a second section of flanges on the second section and connecting together the first section and the second section and forming a single flange that extends along a length of the ridgeback fitting.

The features, functions and advantages that have been discussed can be achieved independently in various aspects or may be combined in yet other aspects, further details of which can be seen with reference to the following description and the drawings.

DETAILED DESCRIPTION

Figure 1:
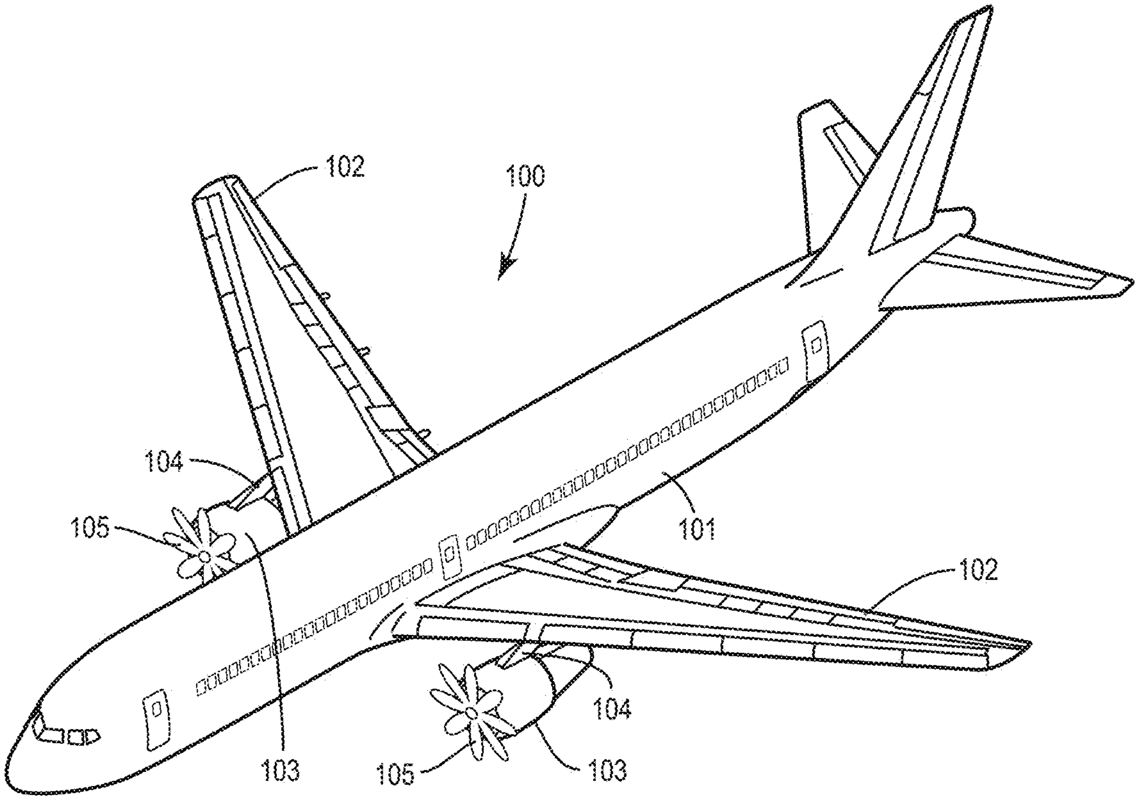
FIG. 1 is an isometric view of an aircraft equipped with fittings to mount engines to the wings.

FIG. 1 illustrates an aircraft 100 that includes a fuselage 101 and wings 102. Engines 103 are mounted to each of the wings 102. This particular aircraft 100 includes an engine 103 mounted to each of the wings 102, although the number and positioning of the engines 103 along the wings 102 can vary. The engines 103 are mounted under the wings 102 to an aerodynamic strut box 104. Various types of engines 103 can be used on the aircraft 100. In some examples, the engines 103 include exposed fan blades. One specific example is an unducted turbofan engine with an exposed fan 105.

Figure 2:
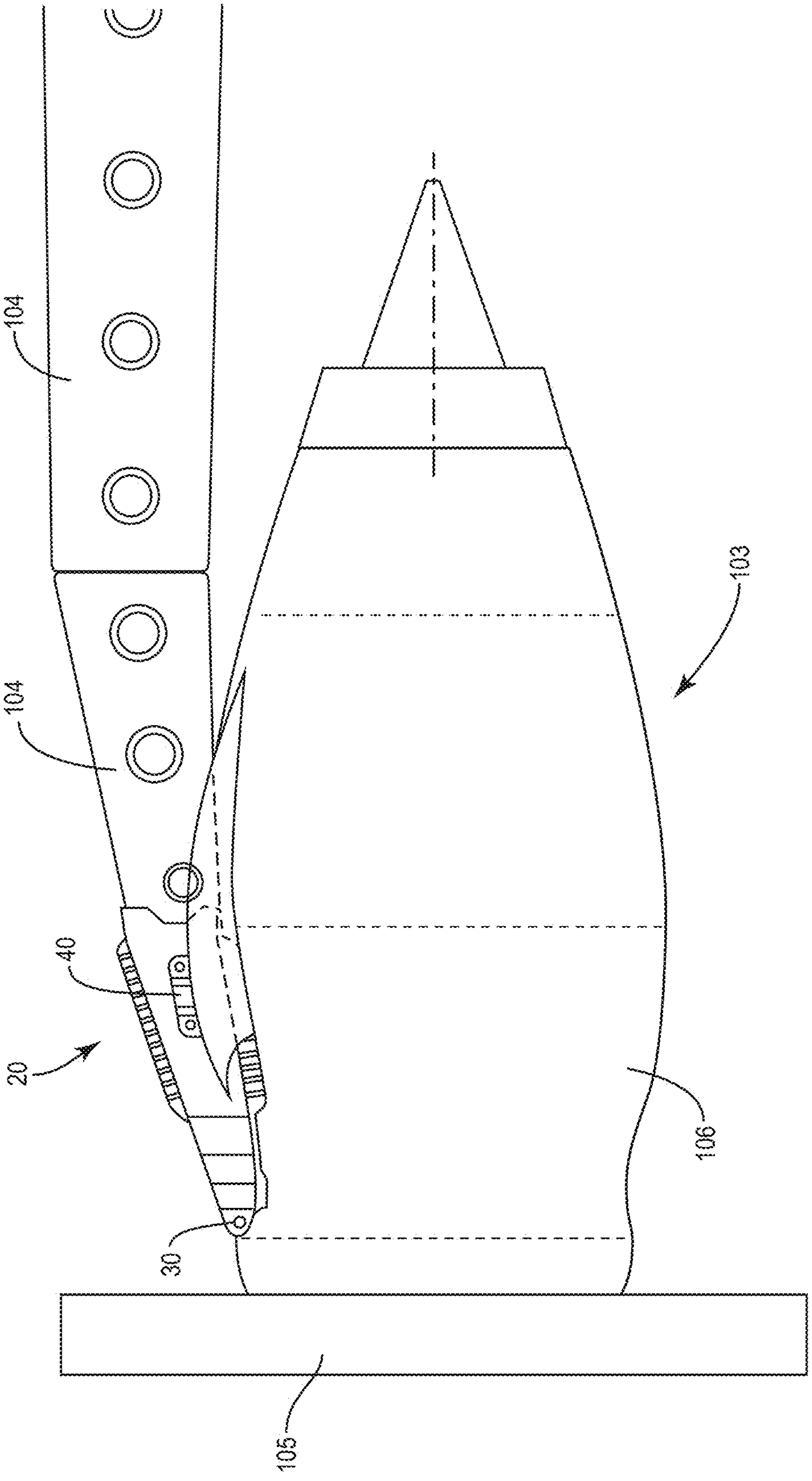
FIG. 2 is a side view of a ridgeback fitting positioned at an end of a strut box and configured to mount the engine to the wing of an aircraft.

FIG. 2 illustrates a side view of the engine 103 mounted to the strut box 104 of the wing 102. The strut box 104 includes a ridgeback fitting 20. The ridgeback fitting 20 is connected to a forward end of the strut box 104. The ridgeback fitting 20 connects to the engine 103 through a forward engine mount fitting 30 and an aft engine mount fitting 40. In the example of FIG. 2 with the engine 103 being an unducted turbofan engine, both the forward engine mount fitting 30 and the aft engine mount fitting 40 connect to an engine fan frame 106 on the forward part of the engine 103. In one example, the forward engine mount fitting 30 and the aft engine mount fitting 40 are spaced apart along the engine 103 by about thirty inches.

The fan 105 of the engine 103 is positioned forward of the ridgeback fitting 20. Air that flows through the fan 105 passes by the ridgeback fitting 20 that is covered by an aerodynamic forward pylon fairing (not illustrated). The ridgeback fitting 20 is shaped to reduce impingement of the air flow on the fan 105. In some examples, the ridgeback fitting 20 is positioned directly behind a center of the fan 105.

Figure 3:
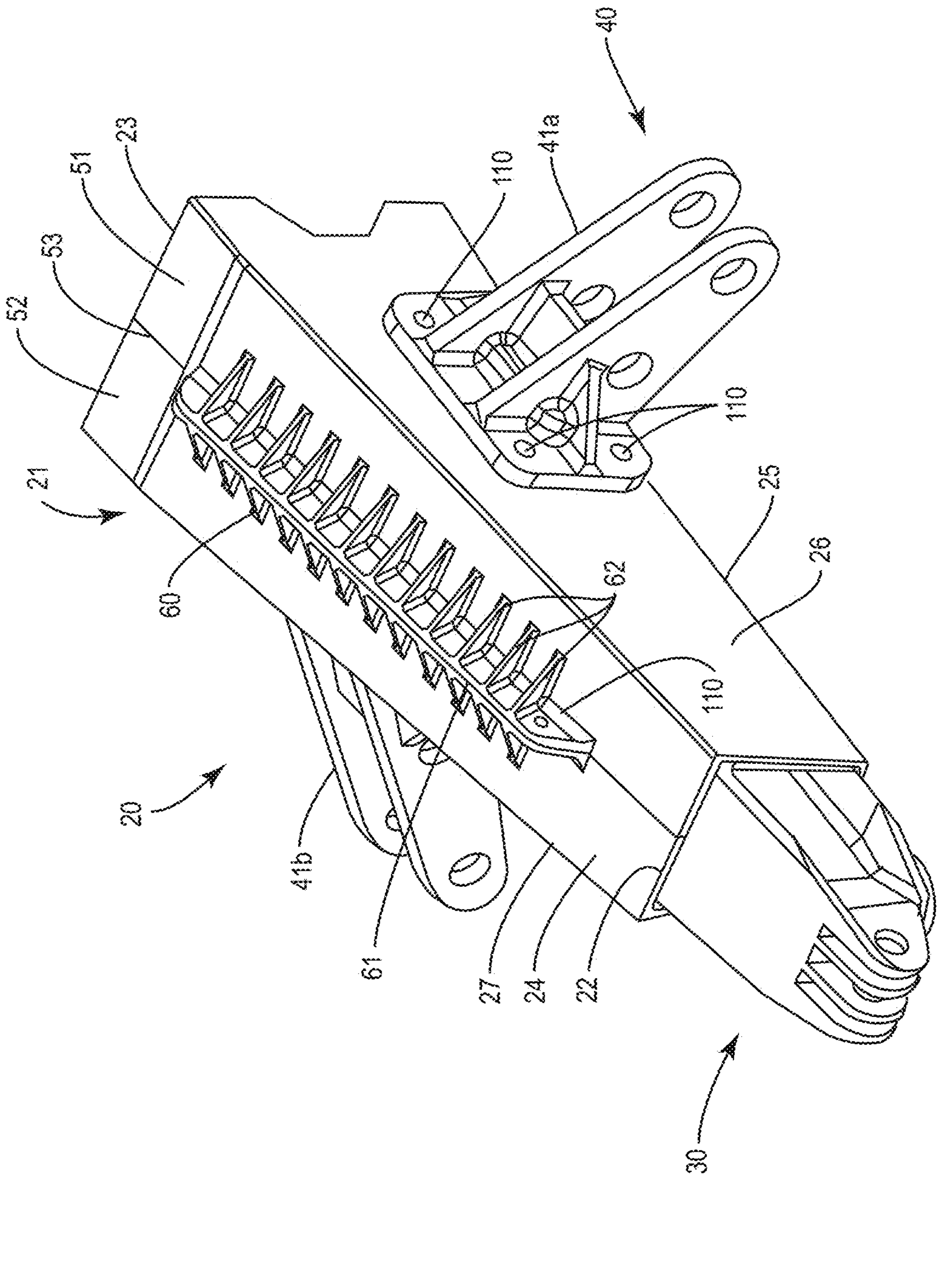
FIG. 3 is an isometric view of a ridgeback fitting connected to a forward engine mount fitting and an aft engine mount fitting.

FIG. 3 illustrates the ridgeback fitting 20 attached to the forward engine mount fitting 30 and the aft engine mount fitting 40. The ridgeback fitting 20 includes a body 21 having an elongated shape with a forward end 22 and a rear end 23. In some examples, the body 21 has a substantially rectangular sectional shape that includes four sides. The body 21 includes opposing top and bottom sides 24, 25 and opposing lateral sides 26, 27. One or more of the sides can be substantially flat as illustrated in FIG. 3. This shape facilitates attachment of the aft mount fitting 40 and airflow. In some examples, one or more of the sides are open or have openings.

In some examples, the body 21 has a tapered shape with a smaller sectional area at the forward end 22 and a larger section area at the rear end 23. This tapered shape provides for transitioning between the strut box that connects to the rear end 23 and the forward engine mount fitting 30 that connects to the forward end 22. The tapered shape also facilitates airflow. In some examples, the taper is consistent along the length from the forward end 22 to the rear end 23.

The body 21 is formed from two sections 51, 52 that abut together and form a joint 53. In some examples, the two sections 51, 52 have a clamshell design that align together. The two sections 51, 52 include exposed edges along an inner side that abut together to form the joint 53. In some examples, each of the sections 51, 52 is substantially equal and forms one-half of the ridgeback fitting 20. In one specific example, the sections 51, 52 are mirror images. In some examples, the sections 51, 52 have different shapes and/or sizes with one of the sections 51, 52 being larger than the other.

An advantage of the body 21 formed by the two sections 51, 52 is the ability to access the interior sides prior to them being connected together. This provides for accessing fasteners 110 that are used to connect one or more of the forward engine mount fitting 30 and aft engine mount fitting 40. This overcomes a current issue with the inability to access these fasteners within an enclosed interior of the strut box (which are often referred to as “blind fasteners”).

In some examples as illustrated in FIG. 3, each section 51, 52 includes a respective lateral side 26, 27 and a portion of the top side 24 and the bottom side 25. In one example as illustrated in FIG. 3, each section 51, 52 forms one-half of the top side 24 and the bottom side 25. The two sections 51, 52 abut together along a joint 53 that extends longitudinally through the body 21. The exposed edges of the sections 51, 52 abut together when connected. In some examples, the edges are flat and aligned to abut together in a non-overlapping configuration. In some examples, the edges are configured to overlap when abutted together. One specific example includes the exposed edges configured to form a lap joint.

Flanges 60 extend along one or more sides of the body 21. The flanges 60 are configured to form a structural interface that takes both shear and tensions loads across the joint 53. The flanges 60 are positioned along one or more of the sides of the ridgeback fitting 20. In some examples, flanges 60 are positioned along the top side 24 and the bottom side 25. In some examples, the ridgeback fitting 20 does not include flanges 60.

The flanges 60 include a central flange section 61 and stiffeners 62 that are spaced apart along the flange section 61. The stiffeners 62 extend laterally outward away from the flange section 61 and have a tapering height that decreases away from the flange section 61. The stiffeners 62 structurally support the flange section 61. The flange section 61 includes leading and trailing ends that are tapered to improve structural load distribution. In examples with flanges 60 on two or more of the sides of the ridgeback fitting 20, the flanges 60 can have the same or different configurations. In some examples, the flanges 60 are symmetrical about a centerline that extends along the flange section 61.

In some examples, the flanges 60 are divided between the first section 51 and the second section 52. Each of the sections 51, 52 includes a portion of the flange section 61 and one set of the stiffeners 62. When the sections 51, 52 are abutted together, the opposing flange sections abut together and form a single flange section 61.

Figure 4:
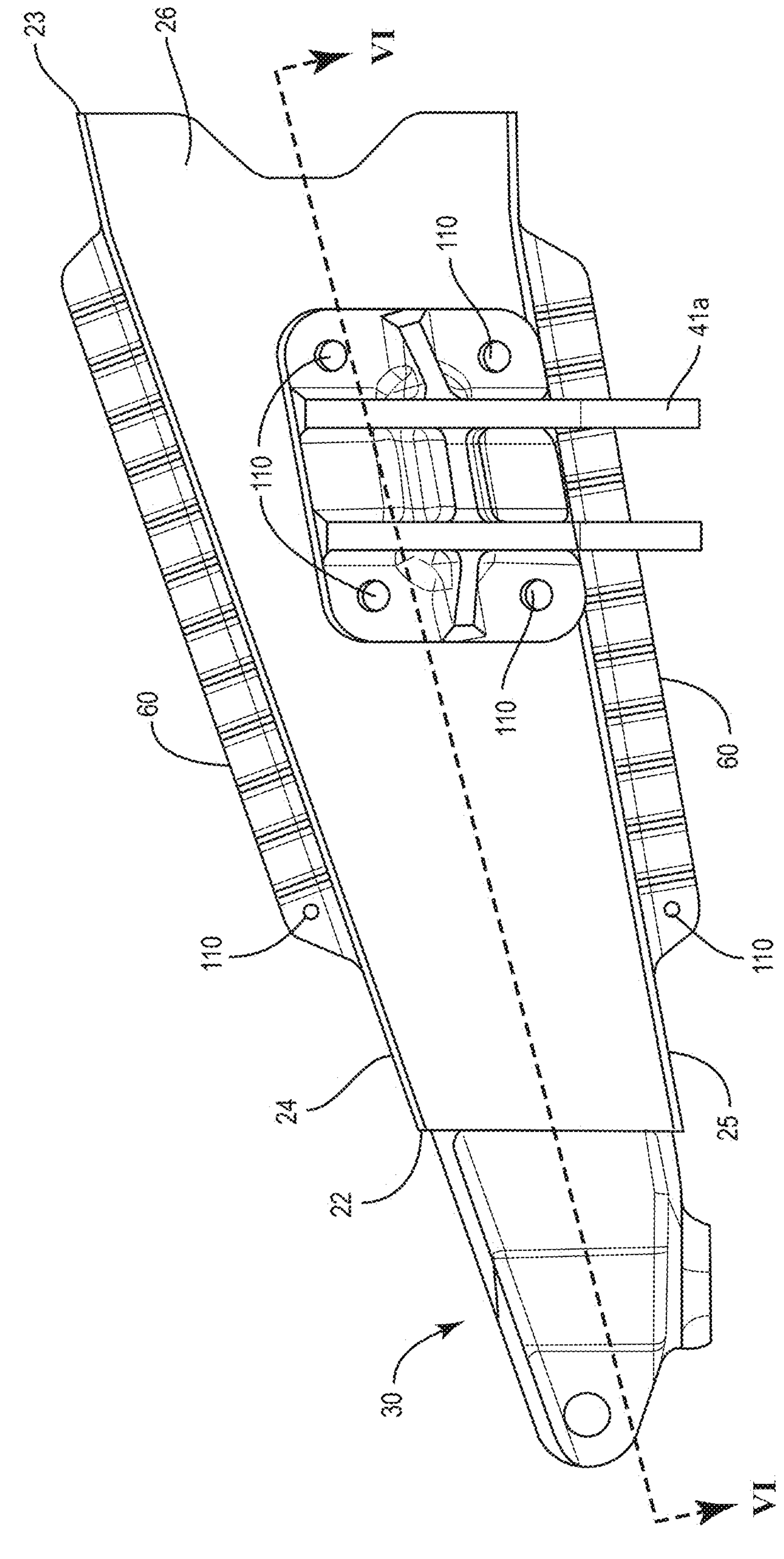
FIG. 4 is a side view of the ridgeback fitting of FIG. 3.

The two sections 51, 52 are connected together by fasteners 110. The fasteners 110 extend through the two sections 51, 52 and bridge the joint 53. In one example as illustrated in FIGS. 3 and 4, each of the sections 51, 52 includes a portion of the flange section 61. The fasteners 110 extend through the flange sections 61 and connect the sections 51, 52 together. In this configuration, the fasteners 110 are aligned perpendicular to the joint 53.

An interior space 29 is formed within the ridgeback fitting 20. The two sections 51, 52 can be designed to have various numbers and arrangements of ribs and pocket configurations. The sections 51, 52 are designed to optimize the load distribution in the ridgeback fitting 20 itself when reacting to engine mount interface loads between the engine 103 and the strut box 104.

Figure 5:
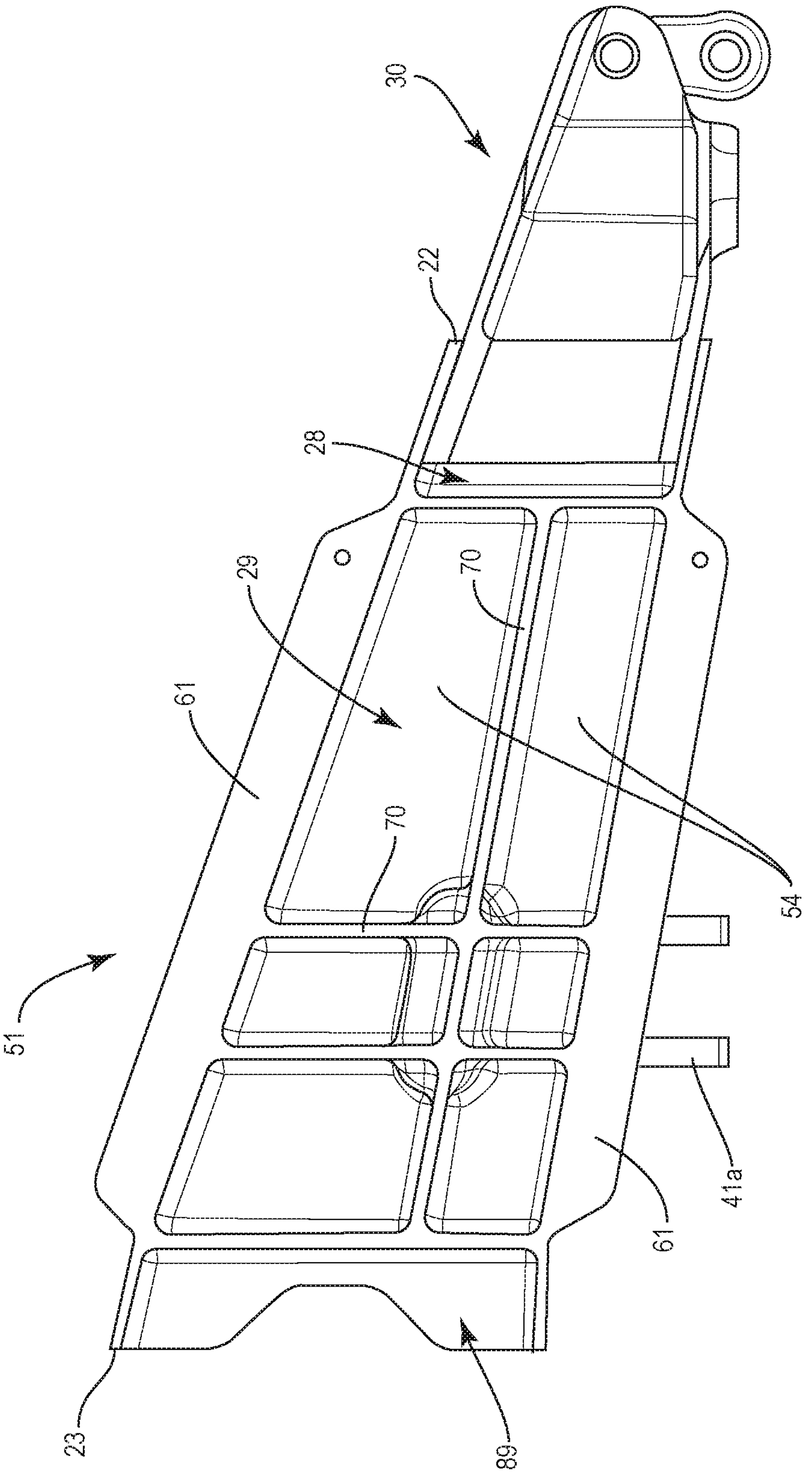
FIG. 5 is a side view of an inner face of a first section of a ridgeback fitting.
Figure 6:
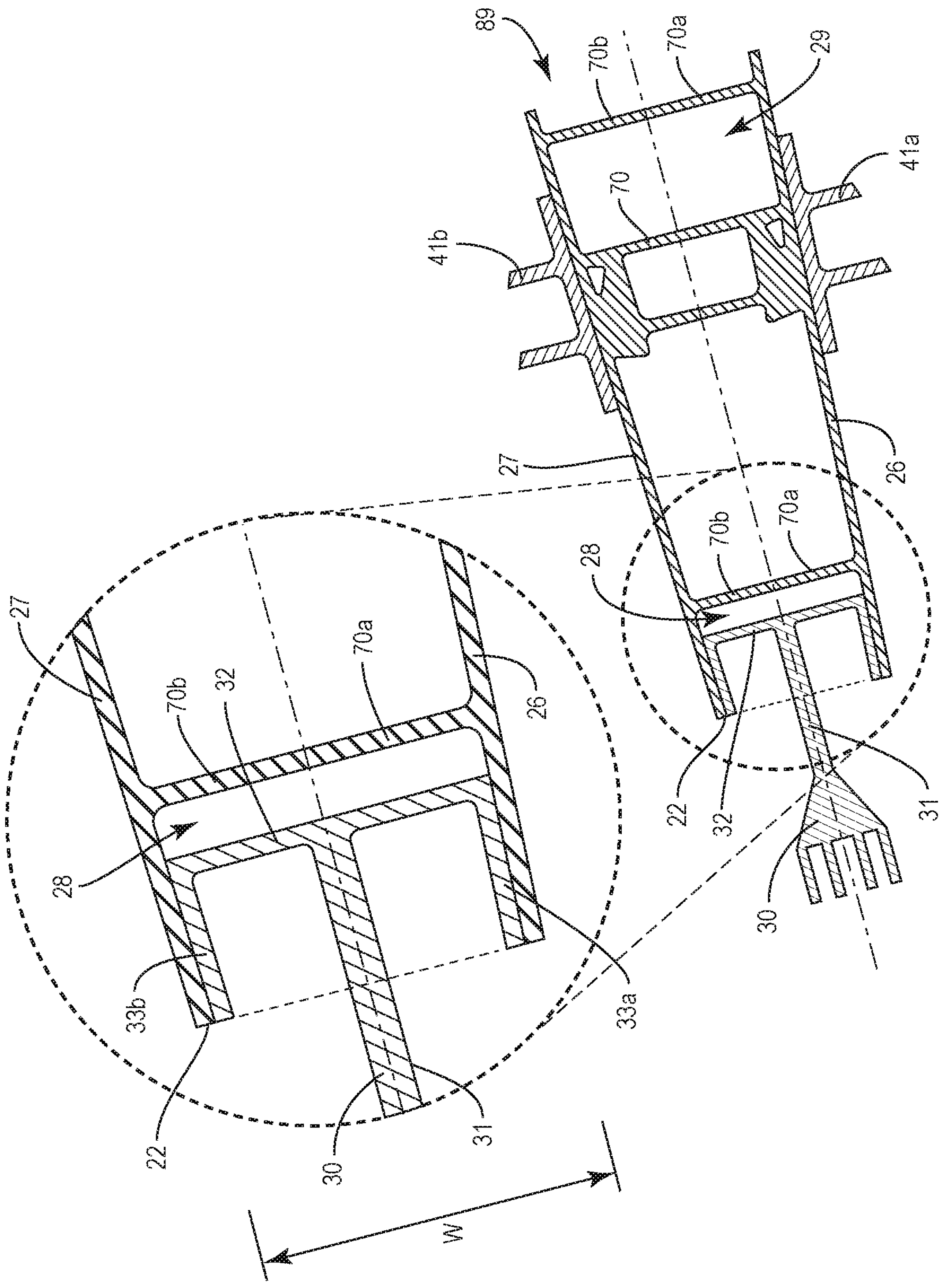
FIG. 6 is a schematic section of a forward engine mount fitting connected to an end of the ridgeback fitting with the view cut along line VI-VI of FIG. 4.

FIGS. 5 and 6 illustrate aspects of the interior space 29. The interior space 29 includes a pocket 28 at the forward end 22 that is open to receive the forward engine mount fitting 30. FIGS. 5 and 6 illustrate examples of the pocket 28 positioned at the forward end 22 and sized to receive the forward engine mount fitting 30. The pocket 28 has a width W measured between opposing sides. In some examples, the width W decreases towards the forward end 22. In some examples, the forward engine mount fitting 30 includes a tapered shape that corresponds to the tapered width W of the pocket 28. These corresponding shapes maintain the forward engine mount fitting 30 attached to the ridgeback fitting 20 and prevent inadvertent detachment from the forward end 22. In some examples, the thickness of the flanges 33*a*, 33*b* are different such that the width W of the pocket 28 is constant and the forward engine mount fitting 30 is not captive when the two halves are joined together. Additionally or alternatively, one or more fasteners 110 connect the forward engine mount fitting 30 to the ridgeback fitting 20.

One or more ribs 70 extend outward from opposing sides and across the interior space 29. The ribs 70 provide strength and stiffness to the ridgeback fitting 20. In some examples, the ribs 70 extend between the opposing lateral sides 26, 27. The ribs 70 are formed from different sections that extend outward from the sides of the different sections 51, 52. When the sections 51, 52 are connected together, the ribs 70 on each of the sections align and abut together.

FIG. 5 illustrates the inner side of section 51. Ribs 70 are positioned in different orientations that extend outward from the inner face of the lateral side 26. Pockets 54 are formed at the ribs 70. The second section 52 (not illustrated) would include ribs with a similar arrangement such that the ribs abut together when the sections 51, 52 are connected together. The configuration of the rib 70 can vary to accommodate different engine mount configurations and is subject to optimization.

The interior space 29 also includes a pocket 89 at the rear end 23. The pocket 89 is sized to receive the strut box 104. In some examples, one or more fasteners 110 connect the strut box 104 to the pocket 89 of the ridgeback fitting 20.

The ridgeback fitting 20 is configured to be connected to the aft engine mount fitting 40 which in turn connects to the engine 103. The aft engine mount fitting 40 includes fittings 41 that are mounted to the lateral sides 26, 27 of the ridgeback fitting 20. Fasteners 110 connect the fittings 41 to the ridgeback fitting 20.

Figure 7:
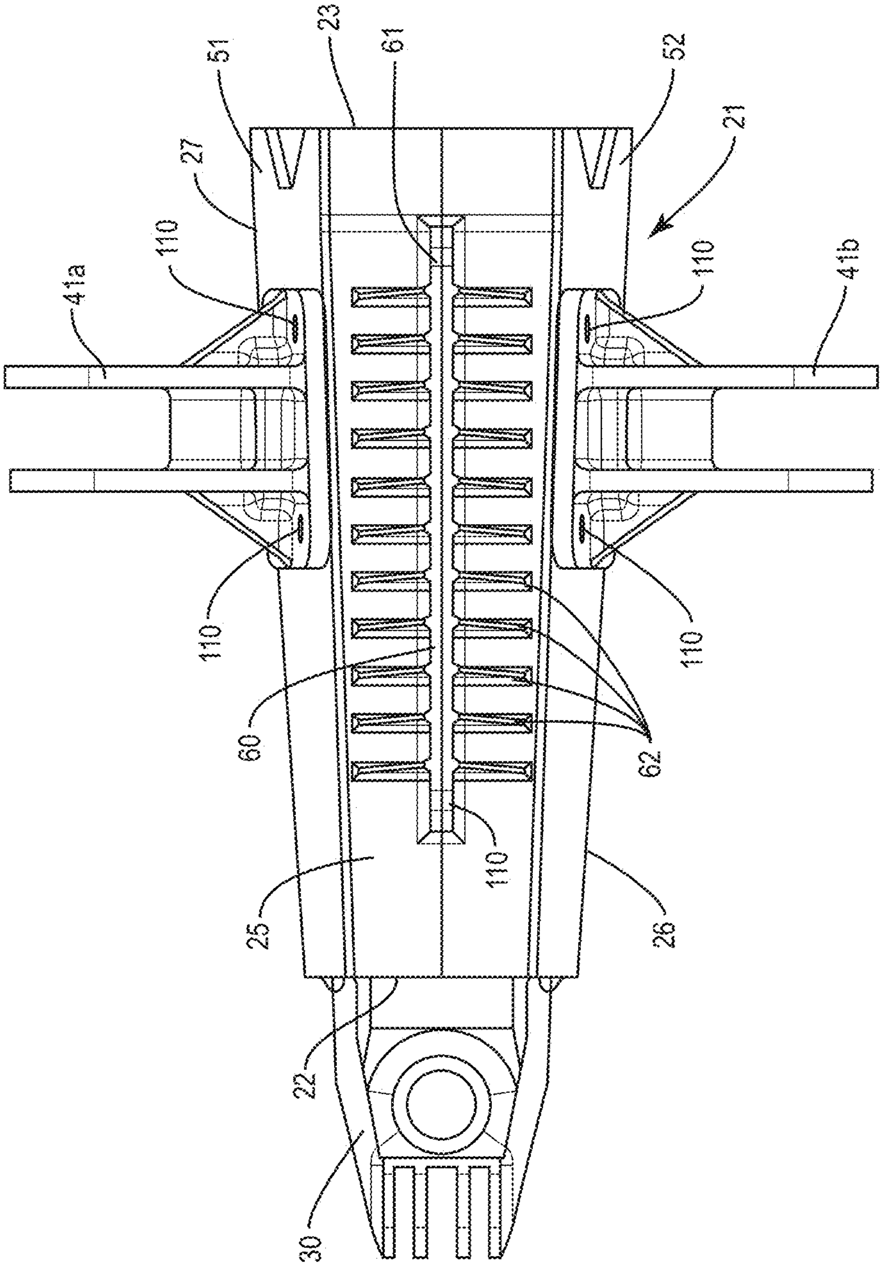
FIG. 7 is a bottom view of one example of a ridgeback fitting.

FIG. 7 illustrates a bottom view of one example of a ridgeback fitting 20. Fittings 41*a*, 41*b* are connected respectively to the opposing lateral sides 26, 27. Fasteners 110 extend through the fittings 41*a*, 41*b* and the lateral sides 26, 27 and into the interior space 29 within the ridgeback fitting 20.

Figure 8:
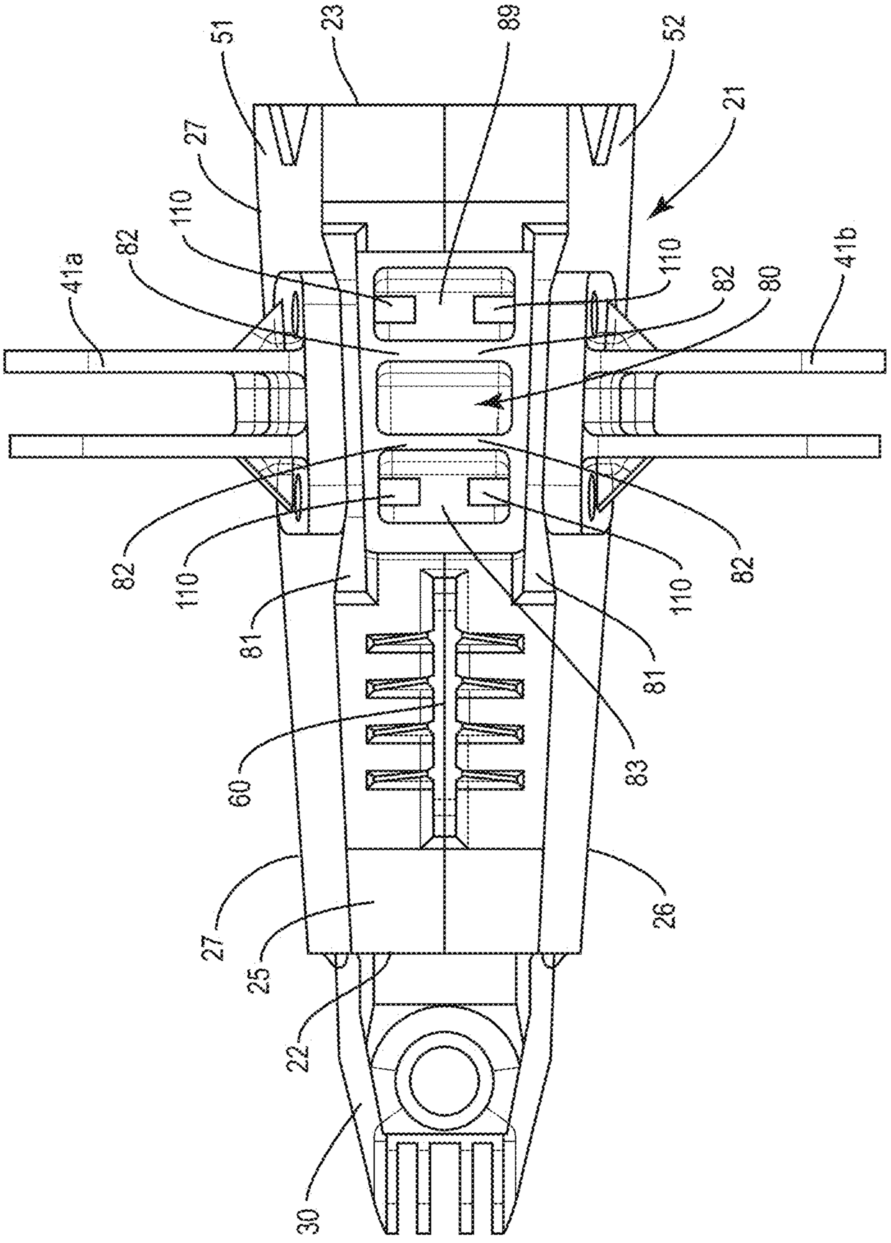
FIG. 8 is a bottom view of another example of a ridgeback fitting.

FIG. 8 illustrates a bottom view of another example of a ridgeback fitting 20. The bottom side 25 includes a receptacle 80 is positioned to receive the fasteners 110 that connect the fittings 41*a*, 41*b*. The receptacle 80 includes lateral walls 81 that extend along the length where the fittings 41*a*, 41*b* connect. Receptacle 80 is designed to allow the fasteners 110 interface between the fittings 41*a*, 41*b* and lateral sides 26, 27 to extend below the bottom side 25. The receptacle 80 also includes central ribs 82 that span across the gap between the lateral walls 81. Gaps 83 are formed between the lateral walls 81 and ribs 82. In some examples, the receptacle 80 is a separate fitting that engages with the first and second sections 51, 52 and spans between the two fittings 41*a*, 41*b*. In other examples, the receptacle 80 is an integral part of the first and second sections 51, 52. The fasteners 110 extend through the lateral sides 26, 27 and lateral walls 81 and into the gaps 83. In one example, the fasteners 110 include shear pins.

Figure 9:
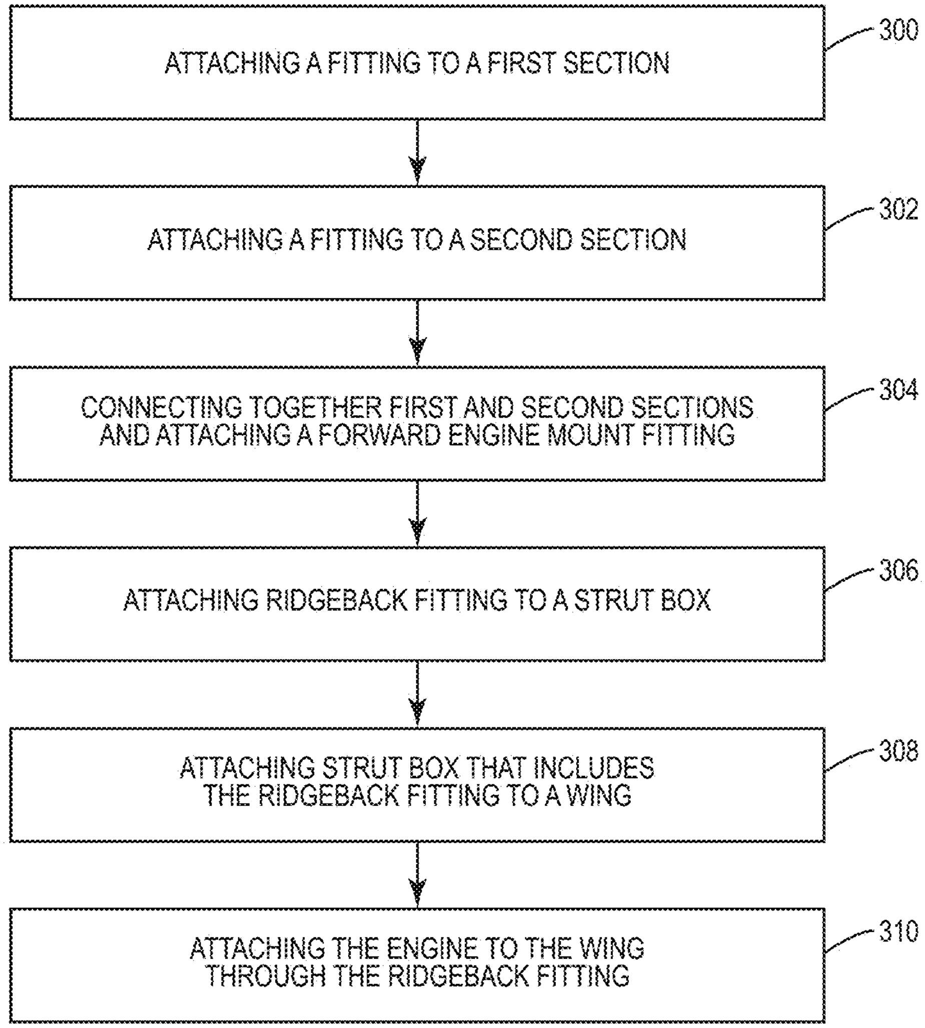
FIG. 9 illustrates a method of attaching an engine to a wing of an aircraft.

FIG. 9 illustrates a method of attaching an engine 103 to a wing 102 of an aircraft 100. A first fitting 41*a* of an aft engine mount fitting 40 is attached to a first section 51 of a ridgeback fitting 20 (block 300). A second fitting 41*b* is attached to a second section 52 of the ridgeback fitting 20 (block 302). The first section 51 and the second section 52 are connected to the forward engine mount fitting 30 (block 304). In some examples, the forward engine mount fitting 30 is positioned between the two separated sections 51, 52. The sections 51, 52 are then connected together thus attaching the forward engine mount fitting 30 to the ridgeback fitting 20. The ridgeback fitting 20 is attached to a strut box 104 (block 306). The strut box 104, including the ridgeback fitting 20, is installed on a wing 102 (block 308). The engine 103 is attached to the wing 102 by attaching to the forward mount fitting 30 and to the aft engine mount fitting 40 (block 310).

The ridgeback fitting 20 can be used to connect a variety of different engines 103 to a wing 102 of an aircraft 100. In some examples, the engines 103 have exposed fan blades. One specific example is an unducted turbofan engine. In other examples, the engine 103 includes ducted fans.

Various types of fasteners 110 are used for connecting the sections 51, 52 and connecting the forward engine mount fitting 30 and/or aft engine mount fitting 40. Examples include but are not limited to rivets, pins, nuts/bolts, and pegs.

By the term "substantially" with reference to amounts or measurement values, it is meant that the recited characteristic, parameter, or value need not be achieved exactly.

Rather, deviations or variations, including, for example, tolerances, measurement error, measurement accuracy limitations, and other factors known to those skilled in the art, may occur in amounts that do not preclude the effect that the characteristic was intended to provide.

The present disclosure may be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

The invention claimed is:

1. A fitting to mount an engine to a wing of an aircraft, the fitting comprising:
- a body with a first end and a second end;
- a first pocket at the first end, the first pocket sized to receive a forward engine mount fitting;
- a second pocket at the second end, the second pocket sized to receive a strut box of the wing of the aircraft;
- a receptacle positioned along one side of the body, the receptacle comprising opposing lateral walls that extend outward from the side of the body and one or more ribs that extend between the lateral walls; and
- wherein the body comprises a first section and a second section that are connected together.

2. The fitting of claim 1, wherein the first section and the second section abut together at a joint that extends along a length of the body.

3. The fitting of claim 1, wherein the body comprises a tapered shape that increases from the first end to the second end.

4. The fitting of claim 3, wherein the taper is consistent along a length from the first end to the second end.

5. The fitting of claim 1, wherein the first section is a mirror image of the second section.

6. The fitting of claim 1, wherein the first end is open to receive the forward engine mount fitting and the second end is open to receive the strut box.

7. The fitting of claim 1, further comprising flanges that extend along a first side of the body and an opposing second side of the body, the flanges comprising a central flange section and laterally-extending stiffeners that are spaced apart along a length of a central flange section.

8. The fitting of claim 7, wherein a first portion of the flanges are mounted to the first section and a second portion of the flanges are mounted to the second section.

9. The fitting of claim 1, further comprising ribs that extend outward from inner sides of the first section and the second section with the ribs abutting together when the first section and the second section are connected together.

10. The fitting of claim 1, wherein the body comprises two or more flat sides.

11. The fitting of claim 1, further comprising an interior space positioned within the body, the interior space comprising the first pocket positioned at the first end of the body to receive the forward engine mount fitting and the second pocket positioned at a second end of the body to receive the strut box of the wing.

12. The fitting of claim 1, wherein the first section and the second section each comprise:
- a lateral side;
- a top side;
- a bottom side;
- an inner side; and
- wherein the first section and the second section are configured to connect together along the inner sides to form the body.

13. The fitting of claim 12, wherein the body comprises:
- a first side formed by the lateral side of the first section;
- a second side formed by the lateral side of the second section;
- a third side formed by the top sides of the first section and the second section; and
- a fourth side formed by the bottom sides of the first section and the second section.

14. A fitting to mount an engine to a wing of an aircraft, the fitting comprising:
- a first section and a second section each comprising:
  - a lateral side;
  - a top side;
  - a bottom side;
  - an inner side;
- wherein the first section and the second section are configured to connect together along the inner sides to form a body with the body comprising:
  - a first side formed by the lateral side of the first section;
  - a second side formed by the lateral side of the second section;
  - a third side formed by the top sides of the first section and the second section;
  - a fourth side formed by the bottom sides of the first section and the second section; and
- an interior space positioned within the body, the interior space comprising a first pocket positioned at a first end of the body to receive a forward engine mount fitting and a second pocket positioned at a second end of the body to receive a strut box of the wing.

15. The fitting of claim 14, wherein the first pocket and the second pocket are each surrounded by the first section and the second section.

16. The fitting of claim 14, wherein the first section is a mirror image of the second section.

17. The fitting of claim 14, further comprising ribs that extend outward from inner faces of the lateral sides of the first section and the second section, the ribs having exposed ends that abut together when the first section and the second section are connected together.

18. The fitting of claim 14, further comprising flanges that extend outward from the body and comprising a flange section and lateral stiffeners, the flanges are configured to form a structural interface that takes both shear and tension.

19. The fitting of claim 14, further comprising a joint wherein the first section and the second section abut together with the joint extend longitudinally through the body.

20. The fitting of claim 14, further comprising a receptacle positioned along one side of the body with the receptacle comprising opposing lateral walls that extend outward from the side of the body and one or more ribs that extend between the lateral walls.

* * * * *